United States Patent
Leng

(10) Patent No.: US 11,022,162 B2
(45) Date of Patent: Jun. 1, 2021

(54) STRUCTURE FOR CONNECTING CROSS MEMBER AND STAND MEMBER OF BUNK BED AND BUNK BED HAVING SAME

(71) Applicant: NEW-TEC INTEGRATION (XIAMEN) CO., LTD., Fujian (CN)

(72) Inventor: Luhao Leng, Fujian (CN)

(73) Assignee: New-Tec Integration (Xiamen) Co., Ltd., Xiamen (CN)

( * ) Notice: Subject to any disclaimer, the term of this patent is extended or adjusted under 35 U.S.C. 154(b) by 265 days.

(21) Appl. No.: 16/068,680

(22) PCT Filed: Jan. 6, 2017

(86) PCT No.: PCT/CN2017/070391
§ 371 (c)(1),
(2) Date: Jul. 9, 2018

(87) PCT Pub. No.: WO2017/118403
PCT Pub. Date: Jul. 13, 2017

(65) Prior Publication Data
US 2019/0024691 A1    Jan. 24, 2019

(30) Foreign Application Priority Data
Jan. 8, 2016   (CN) .......................... 201610012026.7

(51) Int. Cl.
*F16B 12/54*    (2006.01)
*A47C 19/20*   (2006.01)
*A47C 19/00*   (2006.01)

(52) U.S. Cl.
CPC ............ *F16B 12/54* (2013.01); *A47C 19/005* (2013.01); *A47C 19/20* (2013.01); *A47C 19/202* (2013.01)

(58) Field of Classification Search
CPC .......... F16B 12/54; F16B 12/40; F16B 12/42; F16B 12/44; F16B 12/48; F16B 12/58; F16B 2012/403; F16B 7/025; F16B 7/0413; A47C 19/202; A47C 19/005; A47C 19/20; A47C 19/028; Y10T 403/7047; Y10T 403/7051; Y10T 403/7052; Y10T 403/7058
See application file for complete search history.

(56) References Cited

U.S. PATENT DOCUMENTS 3,156,418 A * 11/1964 Jablonski ................ F21S 8/088
                                                        52/28
3,458,234 A *  7/1969 Bates ....................... A47C 7/004
                                                     297/423.38
(Continued)

FOREIGN PATENT DOCUMENTS

CN    2208370 Y    9/1995
CN    2751171 Y    1/2006
(Continued)

*Primary Examiner* — Robert G Santos
*Assistant Examiner* — Alison N Labarge
(74) *Attorney, Agent, or Firm* — Cooper Legal Group, LLC

(57) ABSTRACT

The present invention is provided with a structure for connecting a cross member and a stand member of a bunk bed and a bunk bed. With two pairs of inclined surfaces, the cross member, the upper stand member, and the lower stand member can be quickly connected. The assembly and disassembly are quite convenient, time saving and labor saving.

14 Claims, 9 Drawing Sheets

(56) References Cited

U.S. PATENT DOCUMENTS

| | | | |
|---|---|---|---|
| 3,560,030 A * | 2/1971 | Macks | F16B 17/00 |
| | | | 403/371 |
| 3,886,604 A | 6/1975 | Ewing | |
| 4,989,519 A * | 2/1991 | Welsch | A47B 47/04 |
| | | | 108/192 |
| 6,626,605 B1 * | 9/2003 | Dean | F16B 7/025 |
| | | | 108/147.12 |
| 6,748,878 B2 * | 6/2004 | Chen | A47B 57/265 |
| | | | 108/147.13 |
| 10,349,751 B2 * | 7/2019 | Leng | A47C 19/02 |
| 2004/0071507 A1 * | 4/2004 | Kim | E04C 5/165 |
| | | | 403/368 |
| 2004/0104319 A1 * | 6/2004 | Dean | F16B 7/025 |
| | | | 248/146 |
| 2004/0159623 A1 * | 8/2004 | Craft | A47B 57/34 |
| | | | 211/187 |
| 2005/0273929 A1 * | 12/2005 | Hennings | A47C 19/22 |
| | | | 5/201 |
| 2007/0164174 A1 * | 7/2007 | Hung | F16B 12/40 |
| | | | 248/159 |
| 2011/0219537 A1 | 9/2011 | Lin | |
| 2014/0245534 A1 | 9/2014 | Anderson | |

FOREIGN PATENT DOCUMENTS

| | | | |
|---|---|---|---|
| CN | 201055152 Y | | 5/2008 |
| CN | 202681216 U | | 1/2013 |
| CN | 202789941 U | | 3/2013 |
| CN | 104500524 A | | 4/2015 |
| CN | 105768678 A | | 7/2016 |
| CN | 105782192 A | | 7/2016 |
| CN | 205478742 U | | 8/2016 |
| CN | 205493263 U | | 8/2016 |
| FR | 2442030 A1 * | 6/1980 | B60P 3/38 |
| GB | 2020966 A * | 11/1979 | A47C 17/50 |

* cited by examiner

STRUCTURE FOR CONNECTING CROSS MEMBER AND STAND MEMBER OF BUNK BED AND BUNK BED HAVING SAME

FIELD OF THE INVENTION

The present invention relates to a bunk bed, particularly to a connecting structure of a cross member and a stand member.

RELATED ART

A situation often happens that people have to assemble or disassembled two pipes. Mostly, the two pipes are connected by screws, so screwdriver or other tools is needed; the operation is difficult and complicated. Particularly for a bunk bed, the stand members of the bunk bed are in a height more than two meters, the bed structure may incline or be off balance due to unstable connecting or mispositioning of the cross members and the stand members. Therefore, existing bunk bed needs a quantity of screw bolts to connecting the cross members and the stand members in different portions, resulting in complicated and time waist assembling.

SUMMARY OF THE INVENTION

The present invention is provided with a structure for connecting a cross member and a stand member of a bunk bed and a bunk bed, which overcome the disadvantages of the existing known technology. The technical solution of the present invention is that:

A structure for connecting a cross member and a stand member of a bunk bed, wherein an end portion of the cross member is disposed with a shaft sleeve, the stand member comprises an upper stand member and a lower stand member, the top portion of the lower member is disposed with a joint portion used to connect to the shaft sleeve and the upper stand member, the joint portion is disposed with an insert hole;

the internal side surface of the joint portion and the external side surface of the bottom portion of the upper stand member are inclined surfaces coupled to each other, the bottom portion of the upper stand member is inserted to the insert hole of the joint portion, the external side surface of the bottom portion of the upper stand member and the internal side surface of the joint portion are tightly fitting or interference fitting;

the external side surface of the joint portion and the internal side surface of the shaft sleeve are inclined surfaces coupled to each other, the internal side surface of the shaft sleeve and the external side surface of the joint portion are tightly fitting or interference fitting.

In another preferred embodiment, the inclined surface is conical.

In another preferred embodiment, the joint portion comprises a housing and an inner sleeve, the external side surface of the housing forms the external side surface of the joint portion, the inner sleeve is embedded into the housing, the insert hole is disposed in the inner sleeve, the internal side surface of the inner sleeve forms the internal side surface of the joint portion.

In another preferred embodiment, the housing and the lower stand member are integrally formed; the external edge of the top end of the inner sleeve is disposed with a limit ring protruding outwardly, the limit ring is hanging to the top end face of the shaft sleeve; the bottom end of the side wall of the inner sleeve is disposed with a plurality of claw catches in the periphery; the bottom portion of the upper stand member is inserted to the insert hole of the inner sleeve, the claw catches are stretched to fit tightly to the housing.

In another preferred embodiment, the inner sleeve is made of plastic or other deformable material.

In another preferred embodiment, the inclined surface is conical.

A bunk bed, comprising an upper cross member, a lower cross member and a stand member, wherein the stand member comprises an upper stand member, a central stand member and a lower stand member;

an end portion of the lower cross member is disposed with a shaft sleeve, the top portion of the lower stand member, the shaft sleeve of the lower cross member and the bottom portion of the central stand member are applied above mentioned structure. an end portion of the upper cross member is disposed with a shaft sleeve, the top portion of the central stand member, the shaft sleeve of the upper cross member and the bottom portion of the upper stand member are applied above mentioned structure.

Compared to the existing known technology, the technical proposal of the present invention has advantages:

1. The internal side surface of the joint portion and the external side surface of the bottom portion of the stand member are inclined surfaces opposite arranged, two surfaces are tightly fitting to form a tight fit, realizing the connecting of the upper stand member and the central stand member; the external side surface of the joint portion and the internal side surface of the shaft sleeve are inclined surfaces opposite arranged, two surfaces are tightly fitting to form a tight fit, realizing the connecting of the upper cross member and the central stand member; with the two pairs of inclined surfaces, the cross member, the upper stand member and the bottom stand member can be quickly connected, the assembly and the disassembly are convenient, time saving and labor saving.

2. The joint portion comprises a housing and an inner sleeve, the side wall of the inner sleeve is disposed with a plurality of elastic claw catches, the claw catches can stretch to connect tightly to the housing, the structure is more stable.

BRIEF DESCRIPTION OF THE DRAWINGS

The present invention will be further described with the drawings and the embodiments.

DETAILED DESCRIPTION OF THE EMBODIMENTS

Figure 1:
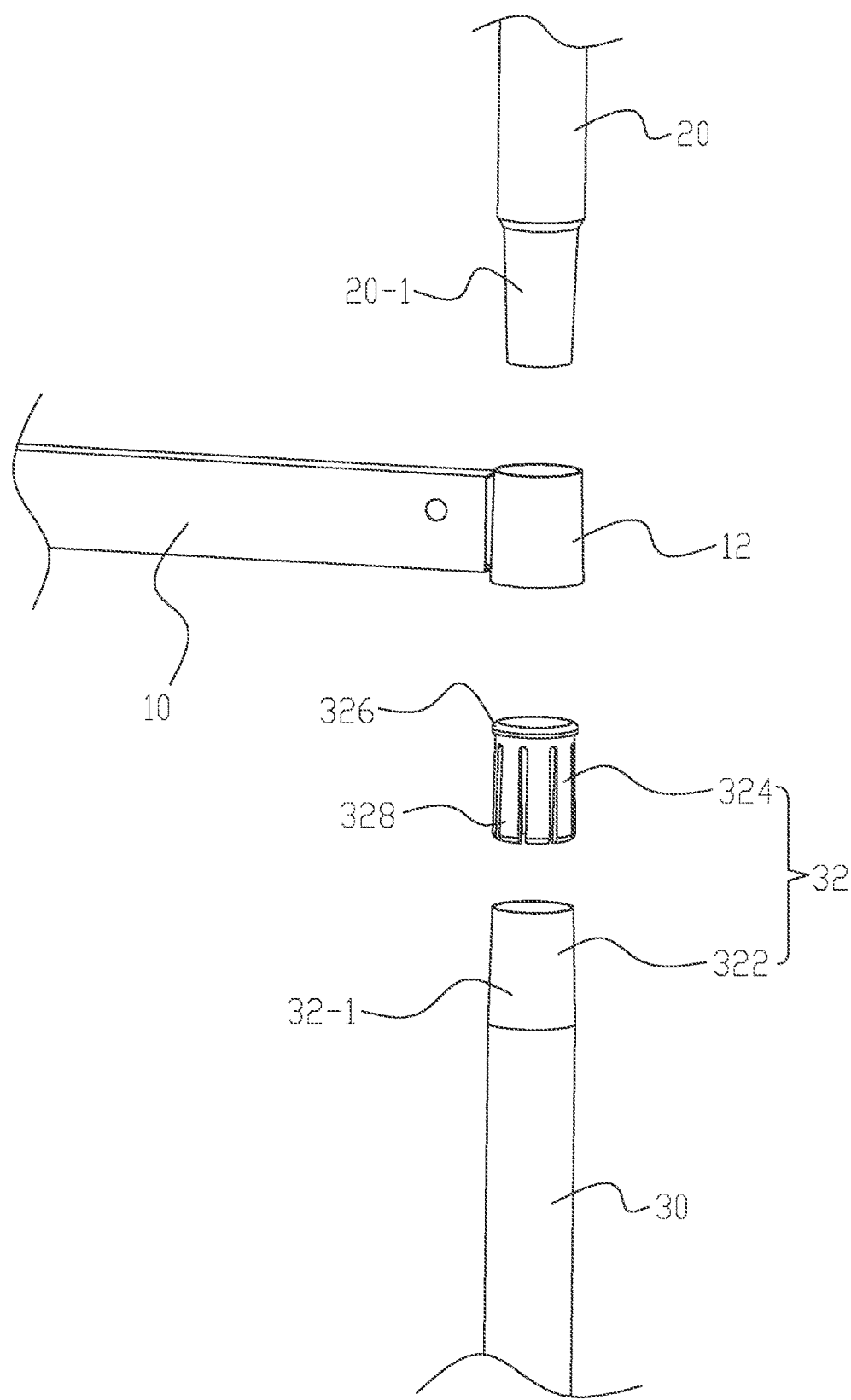
FIG. 1 illustrates an exploded diagram of a structure for connecting a cross member and a stand member of a bunk bed of the present invention.
Figure 2:
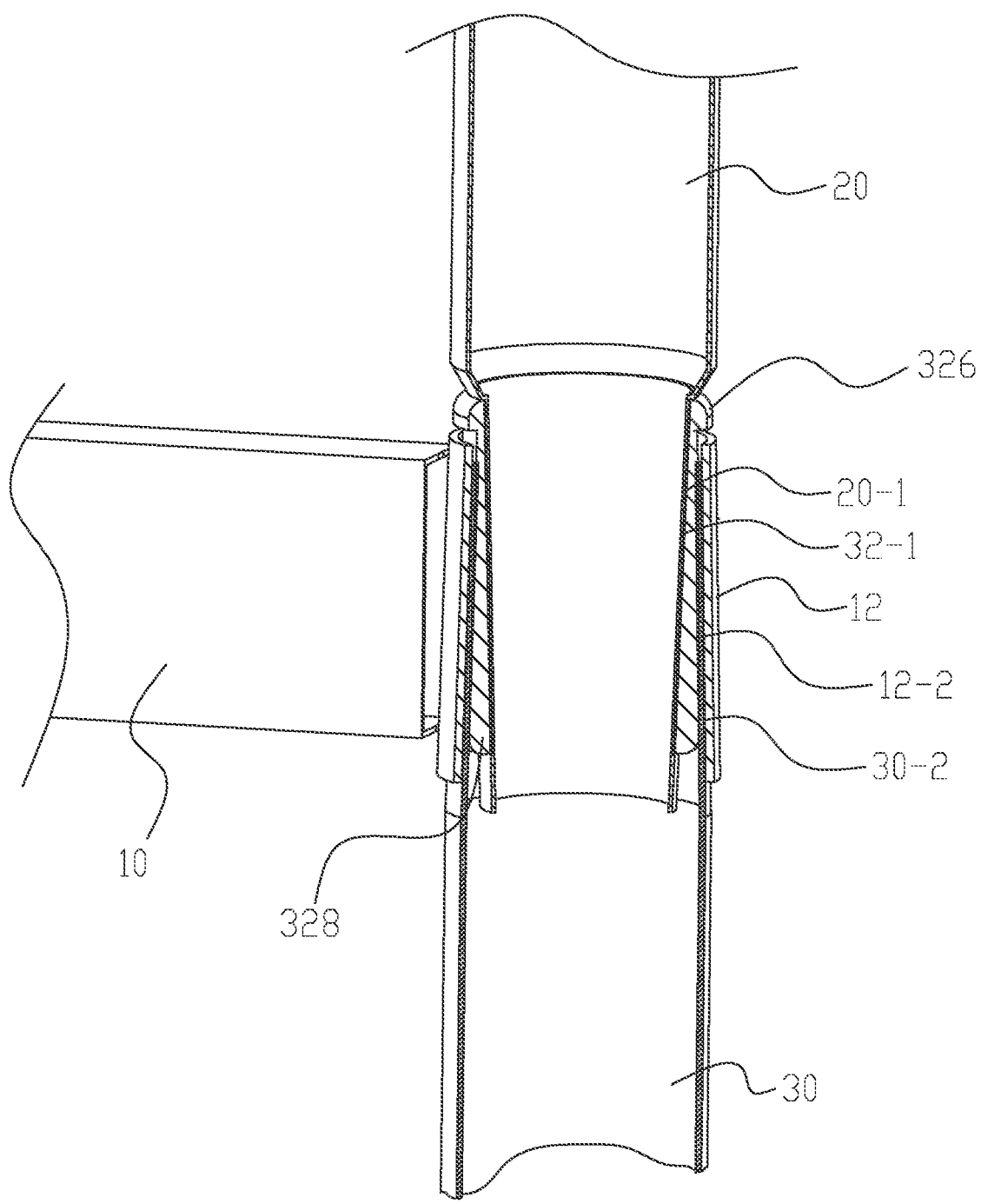
FIG. 2 illustrates a sectional diagram of the assembled of FIG. 1.

Referring to FIG. 1 and FIG. 2, a structure of a cross member and a stand member of a bunk bed of the present invention is provided that an end portion of the cross member 10 is disposed with a shaft sleeve 12, the stand member comprises a upper stand member 20 and a lower stand member 30 inserted connected, the top portion of the lower stand member 30 is disposed with a joint portion 32 used to connect to the shaft sleeve 12 and the upper stand member 20; the joint portion 32 is disposed with an insert hole, forming an internal side surface 32-1 and an external side surface 32-2.

The internal side surface 32-1 of the joint portion 32 and the external side surface 20-1 of the bottom portion of the upper stand member 20 are a pair of inclined surfaces opposite arranged, the bottom portion of the upper stand member 20 is inserted to the insert hole; the external side surface of the bottom portion of the upper stand member 20 and the internal side surface 32-1 of the joint portion 32 are tightly connected so as to connect the upper stand member 20 and the lower stand member 30;

The external side surface 32-2 of the joint portion 32 and the internal side surface 12-2 of the shaft sleeve 12 are a pair of inclined surfaces arranged opposite, the shaft sleeve 12 is sleeved on the joint portion 32; the internal side surface 12-2 of the shaft sleeve and the external side surface 32-2 of the joint portion 32 are tightly connected so as to connect the cross member 10 and the lower stand member 30.

The shaft sleeve 12, the upper stand member 20 and the lower stand member 30 are in a straight line; the internal side surface 32-1 and the external side surface 20-1 are tightly fitting, the external side surface 32-2 and the internal side surface 12-2 are tightly fitting; the cross member 10, the upper stand member 20 and the lower stand member are tightly connected without any screw bolt.

In this embodiment, the surface is conical. Namely, the internal side surface 32-1 and the external side surface 20-1 are conical surfaces coupled to each other in sleeve way, the external side surface 32-2 and the internal side surface 12-2 are conical surfaces coupled to each other in sleeve way, the connecting has better strength.

Preferred, the joint portion 32 comprises a housing 322 and an inner sleeve 324, the external side surface of the housing 322 forms the external side surface 32-2 of the joint portion, the inner sleeve 324 is embedded to the housing 322, the insert hole is disposed at the inner sleeve 324, the internal side surface of the inner sleeve 324 forms the internal side surface 32-1 of the joint portion. The housing 322 and the lower stand member 30 are integrally formed, being a hollow pipe; the external edge of the top end of the inner sleeve 324 is disposed with a limit ring 326 protruding outwardly, the limit ring 326 is hanging to the top end face of the shaft sleeve 12; the bottom end of the side wall of the inner sleeve 324 is disposed with a plurality of elongated holes arranged in a ring array, forming a plurality of elastic claw catches 328 arranged in a ring array; the bottom portion of the upper stand member 20 is inserted to the insert hole, the elastic claw catches 328 are stretched to tightly fit to the housing 333, thus preventing the inner sleeve 324 from detaching from the housing 322. The inner sleeve 324 is plastic with well deforming performance.

Figure 3:
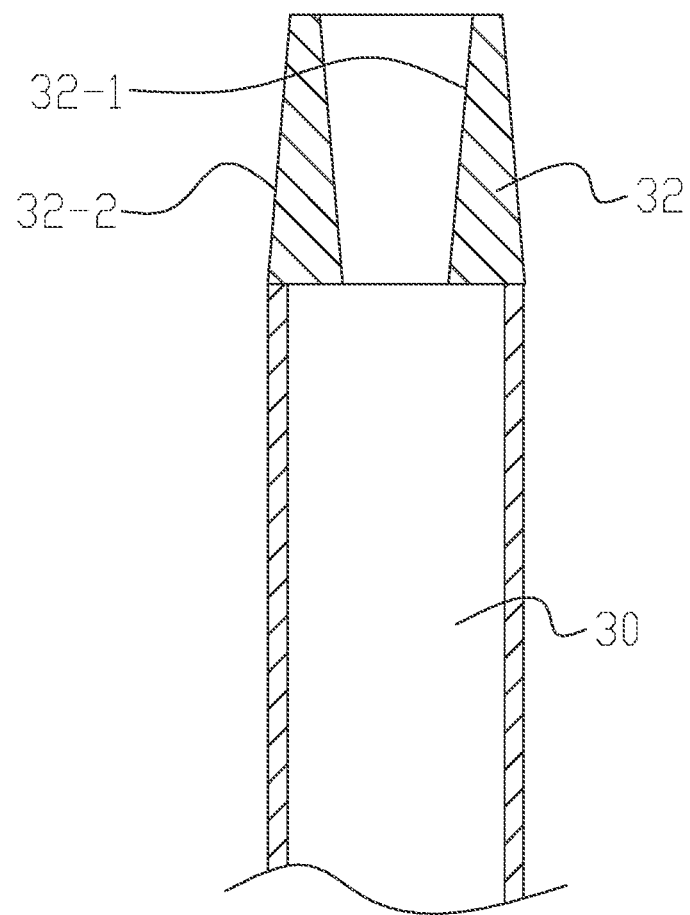
FIG. 3 illustrates a sectional diagram of the lower stand member and the housing of the present invention in another embodiment.
Figure 4:
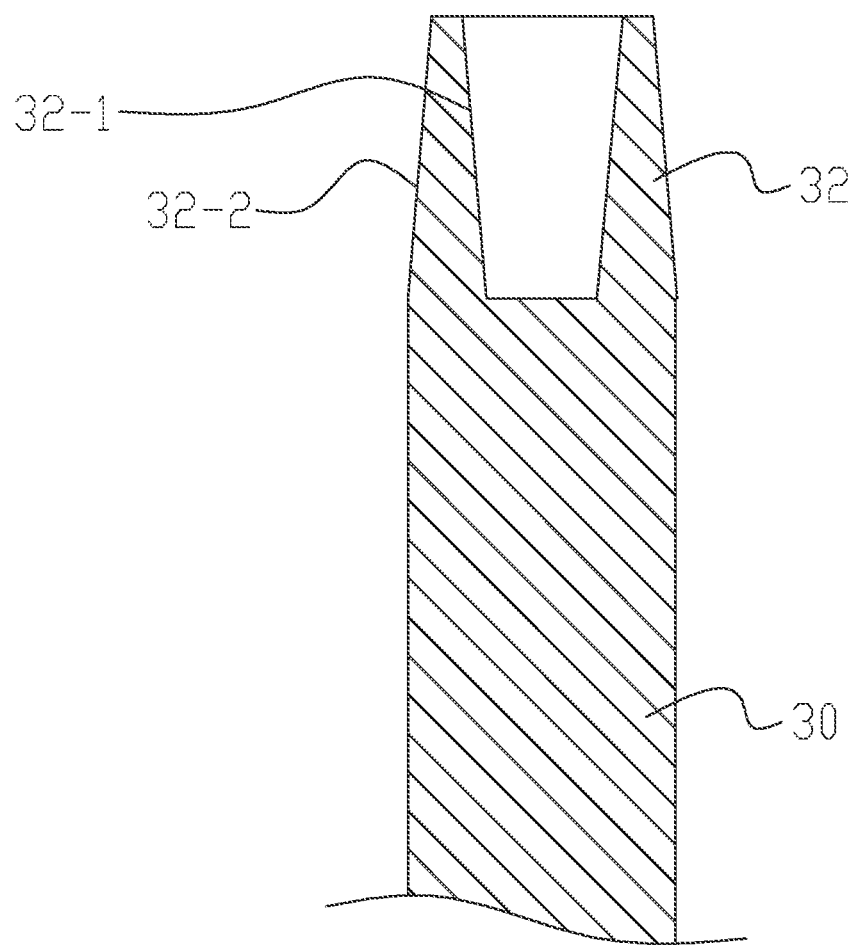
FIG. 4 illustrates a sectional diagram of the lower stand member and the housing of the present invention in another embodiment.

Referring to FIG. 3, it should be understood that, the solution can be realized only if the central portion of the joint portion 32 is disposed with the insert hole to form the internal side surface 32-1 and the external side surface 32-2 to fit to the external side surface 20-1 of the upper stand member and the internal side surface 12-2 of the shaft sleeve. So the joint portion 32 can be an independent part to be directly welded or locked to the top portion of the lower stand member 30. The lower stand member 30 can be a hollow pipe or a solid pipe. Or referring to FIG. 4, the joint portion 32 is directly integrally formed with the solid lower stand member 30.

Figure 5:
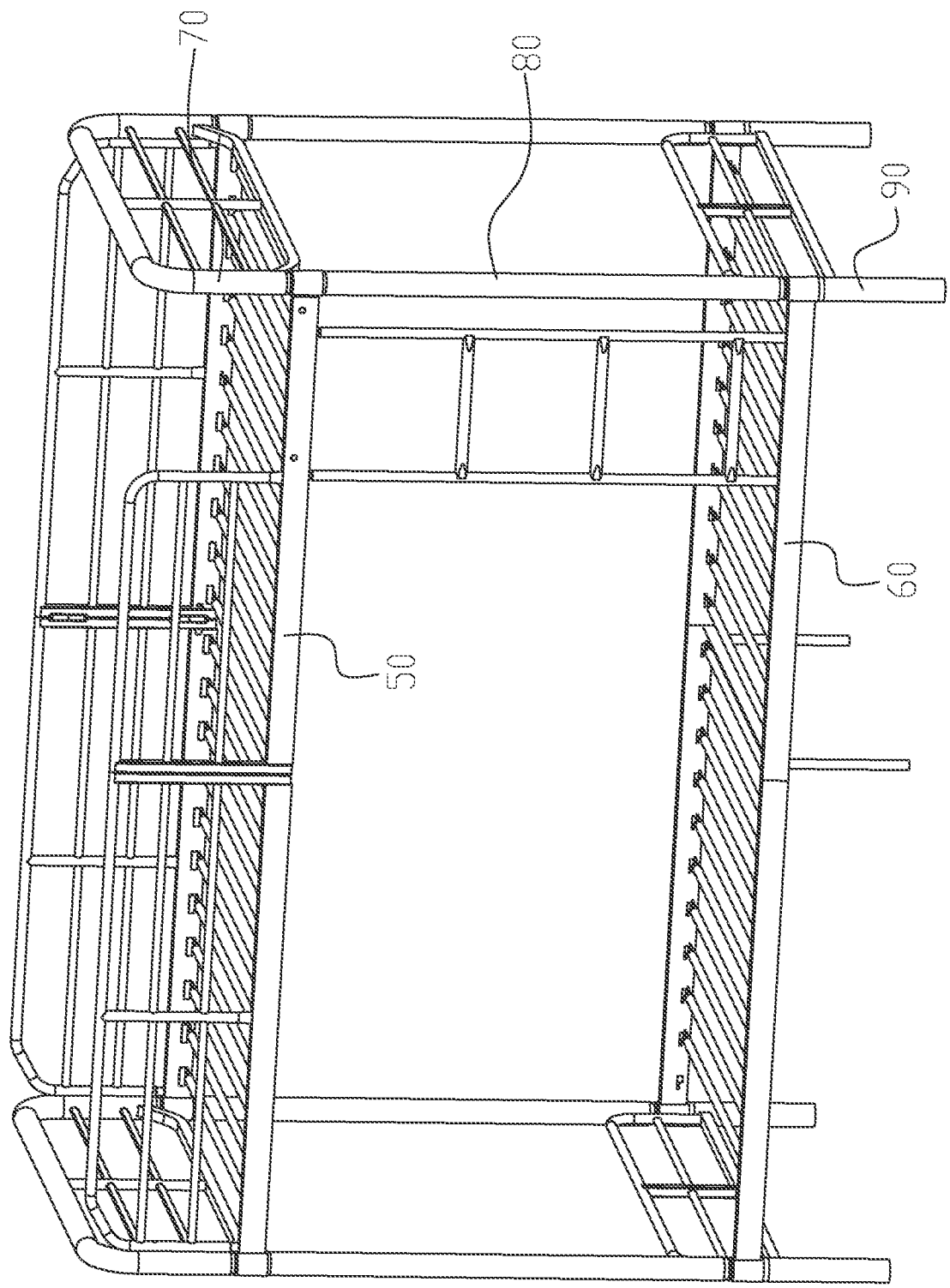
FIG. 5 illustrates a schematic diagram of a bunk bed of the present invention.
Figure 6:
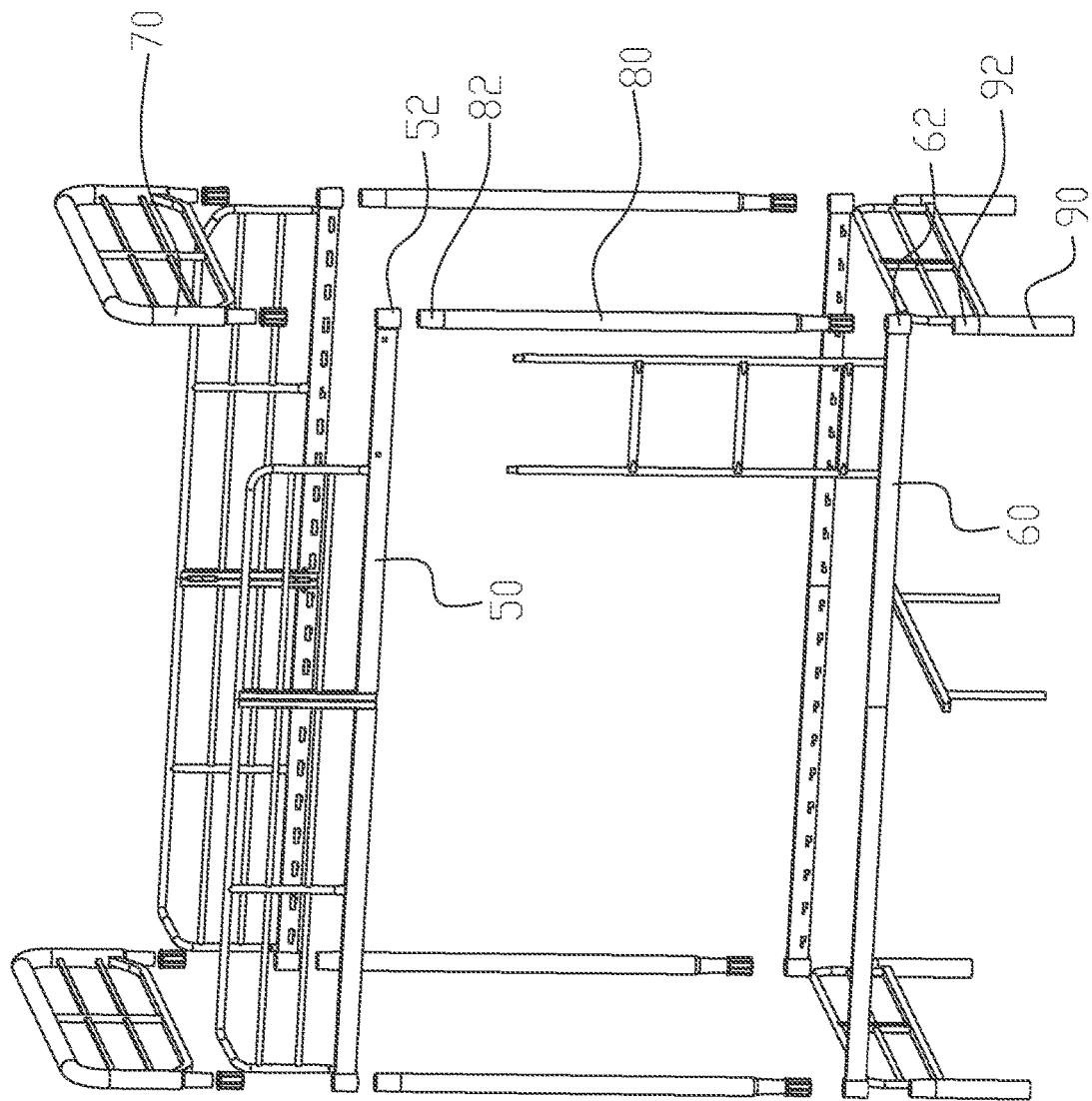
FIG. 6 illustrates an exploded diagram of the bunk bed of FIG. 5.
Figure 7:
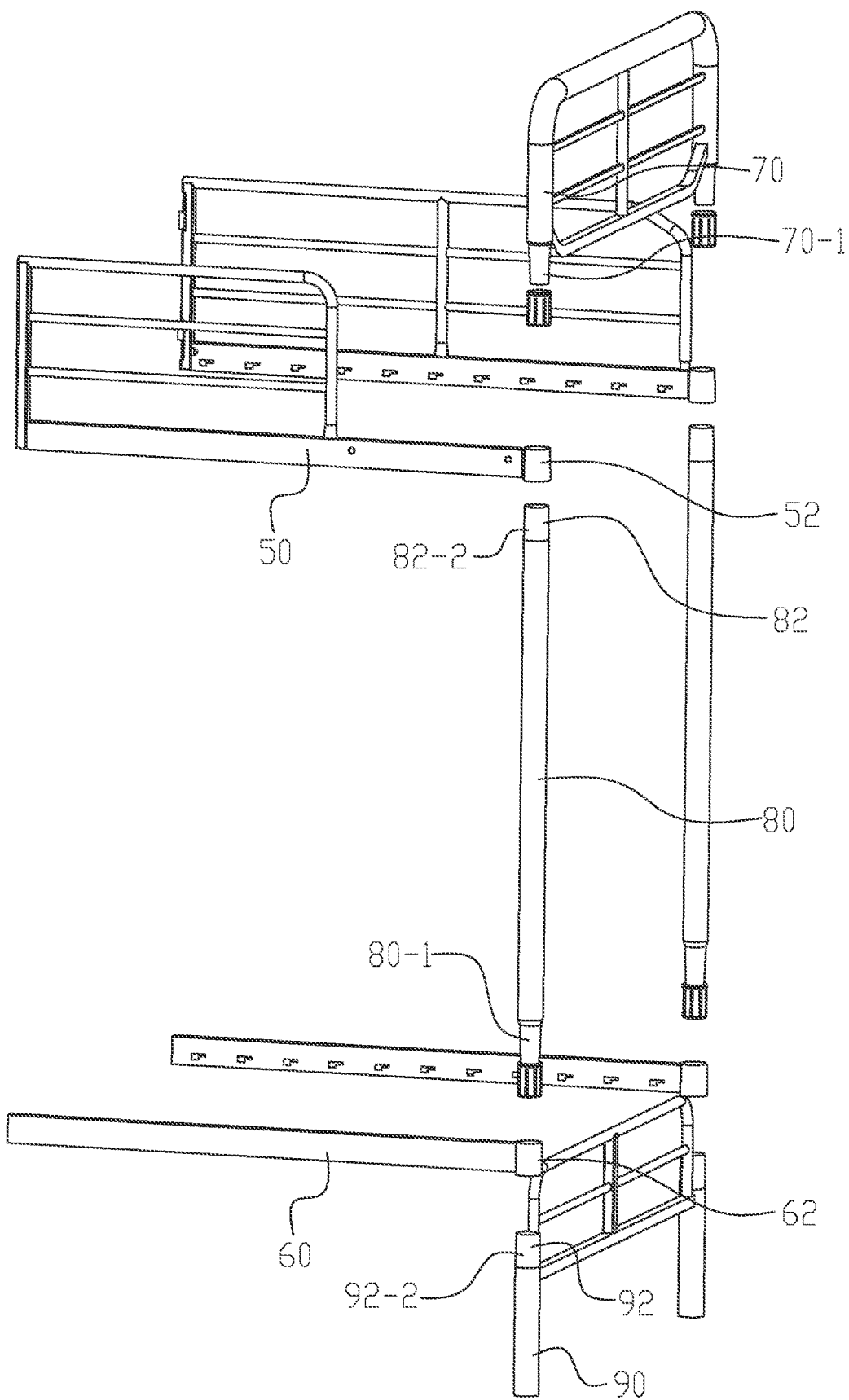
FIG. 7 illustrates a partial exploded diagram of the bunk bed of FIG. 5.

Referring to FIGS. 5-7, a bunk bed of the present invention comprises an upper cross member 50, a lower cross member 60 and a stand member. The stand member comprises an upper stand member 70, a central stand member 80 and a lower stand member 90.

Figure 8:
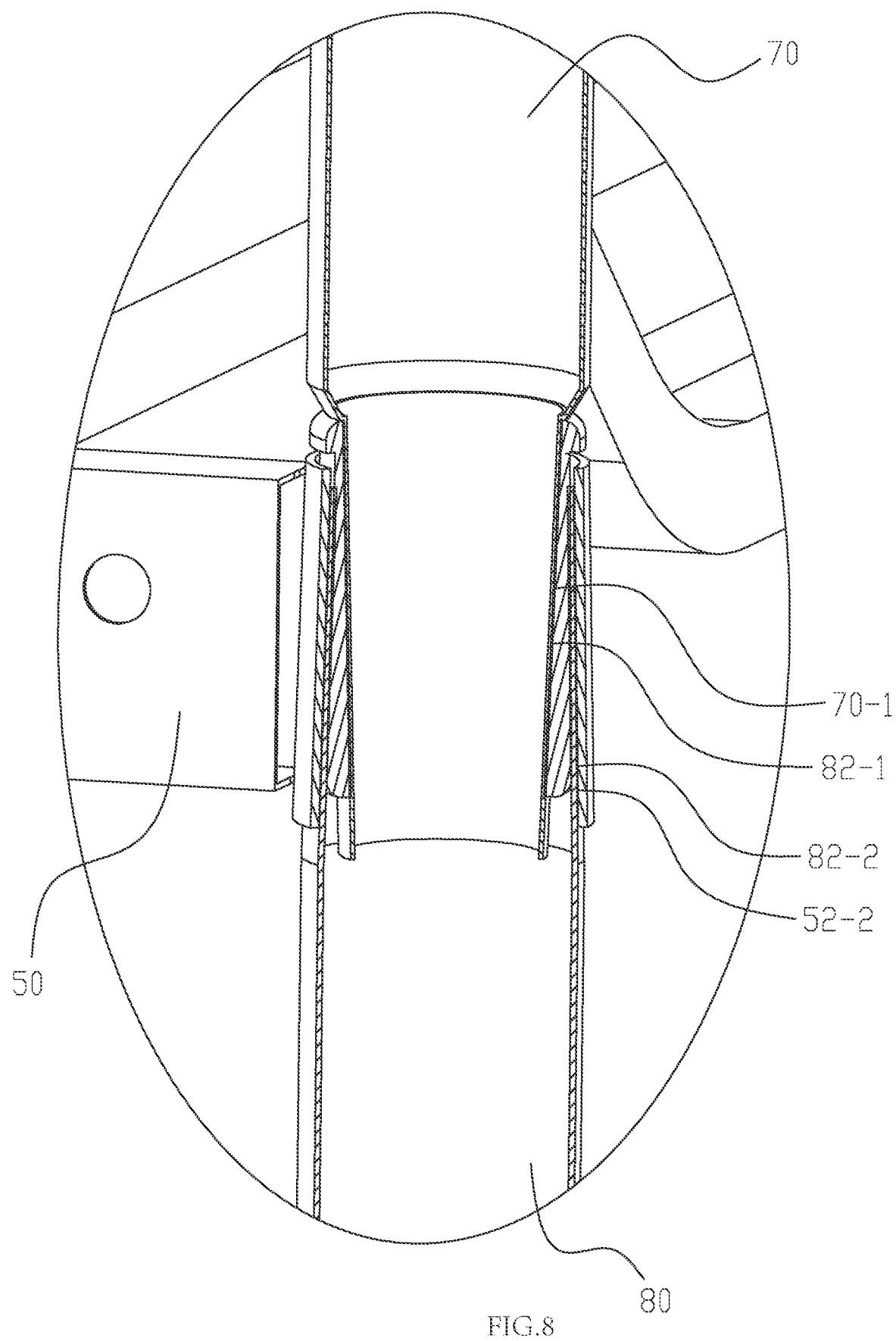
FIG. 8 illustrates a schematic diagram of the connecting of the cross member, the upper stand member and the central stand member of the bunk bed of FIG. 5.

Referring to FIG. 7 and FIG. 8, an end portion of the upper cross member 50 is disposed with a shaft sleeve 52, the shaft sleeve is disposed with an internal side surface 52-2. The top portion of the central stand member 80 is disposed with a joint portion 82 used to connect to the shaft sleeve 52 of the upper cross member and the upper stand member. The central portion of the joint portion is disposed with an insert hole, forming an internal side surface 82-1 and an external side surface 82-2. The internal side surface 82-1 of the joint portion and the external side surface 70-1 of the bottom portion of the upper stand member 70 are a pair of inclined surfaces arranged opposite, the bottom portion of the upper stand member 70 is inserted to the insert hole, the external side surface 70-1 of the bottom portion of the upper stand member and the internal side surface 82-1 of the joint portion are tightly fitting so as to connect the upper stand member 70 and the central stand member 80. The external side surface 82-2 of the joint portion and the internal side surface 52-2 of the shaft sleeve 52 are a pair of inclined surfaces arranged opposite, the shaft sleeve 52 is sleeved on the joint portion 82, the internal side surface 52-2 of the shaft sleeve and the external side surface 82-2 of the joint portion are tightly fitting to connect the upper cross member and the central stand member 80. The upper stand member 70, the shaft sleeve 52 and the central stand member 80 are in a straight line.

Figure 9:
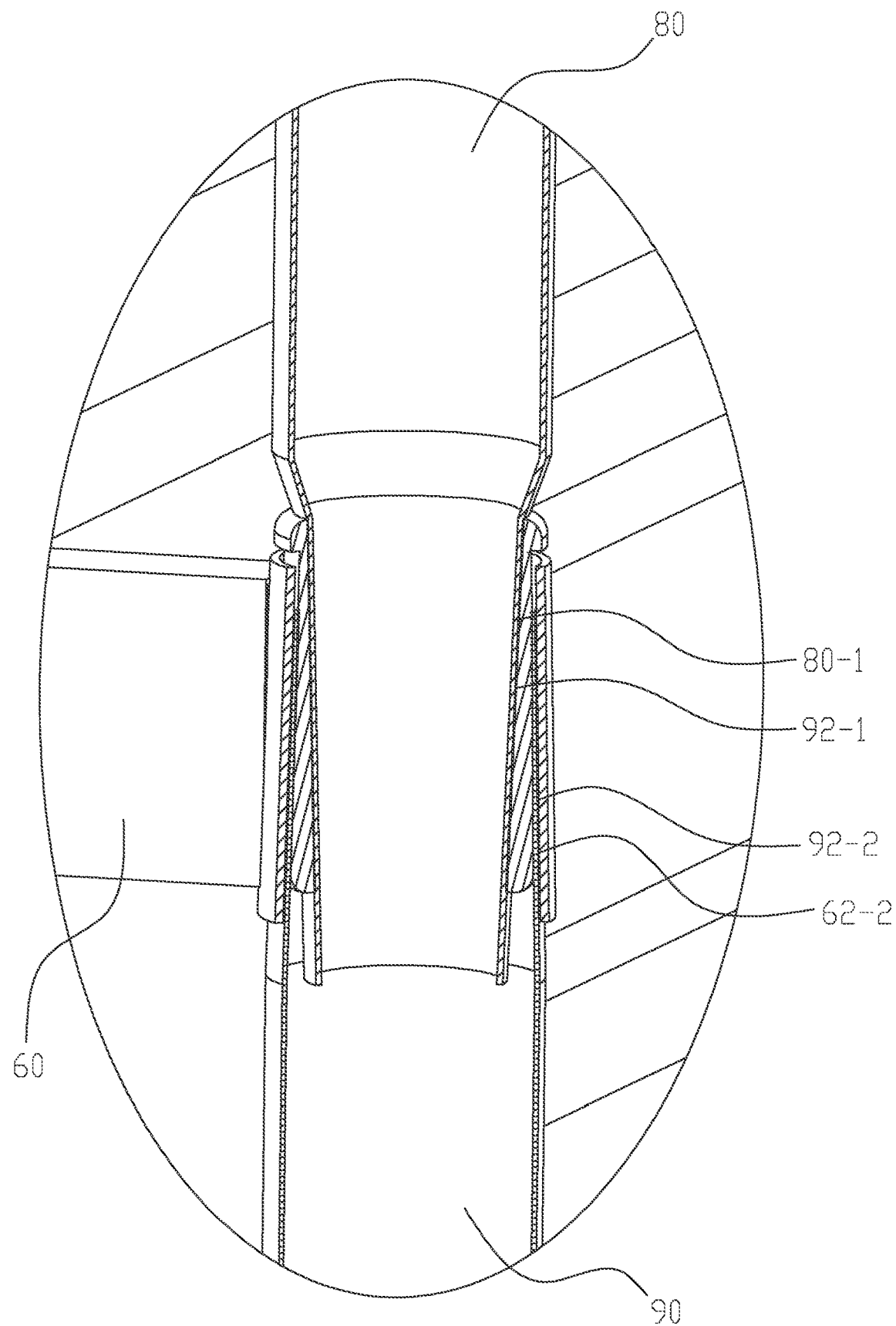
FIG. 9 illustrates a schematic diagram of the connecting of the lower cross member, the lower stand member and the central stand member of the bunk bed of FIG. 5.

Referring to FIG. 7 and FIG. 9, an end portion of the lower cross member 60 is disposed with a shaft sleeve 62, the shaft sleeve is disposed with an internal side surface 62-2. The top portion of the lower stand member 90 is disposed with a joint portion 92 used to connect to the shaft sleeve 62 of the lower cross member and the central stand member 80. The central portion of the joint portion is disposed with an insert hole, forming an internal side surface 92-1 and an external side surface 92-2. The internal side surface 92-1 of the joint portion and the external side surface 80-1 of the bottom portion of the central stand member are a pair of inclined surfaces arranged opposite, the bottom portion of the central stand member 80 is inserted to the insert hole, the external side surface 80-1 of the bottom portion of the central stand member and the internal side surface 92-1 of the joint portion are tightly fitting so as to connect the central stand member 80 and the lower stand member 90. The external side surface 92-2 of the joint portion and the internal side surface 62-2 of the shaft sleeve are a pair of inclined surfaces arranged opposite, the shaft sleeve 62 is sleeved on the joint portion 92, the internal side surface 62-2 of the shaft sleeve and the external side surface 92-2 of the joint portion are tightly fitting to connect the lower cross member 60 and the lower stand member 90. The central stand member 80, the shaft sleeve 62 and the lower stand member 90 are in a straight line.

In this embodiment, the inclined surface is conical. Namely, the internal side surface 82-1 and the external side surface 70-1 are conical surfaces coupled to each other in sleeve way, the external side surface 82-2 and the internal side surface 52-2 are conical surfaces coupled to each other in sleeve way, the internal side surface 92-1 and the external side surface 80-1 are conical surfaces coupled to each other in sleeve way, the external side surface 92-2 and the internal side surface 62-2 are conical surfaces coupled to each other in sleeve way, the connecting has better strength.

The joint portion 82 and 92, having the same structure as the previous joint portion 32, comprises the housing and the inner sleeve, the housing of the joint portion 82 is connected to the top portion of the central stand member 80, the housing of the joint portion 92 is connected to the top portion of the lower stand member 90, the structure of the joint portion 82 and 92 will be not further described.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a structure for connecting a cross member and a stand member of a bunk bed and a bunk bed. With two pairs of inclined surfaces, the cross member, the upper stand member and the lower stand member can be quickly connected. The assembly and disassembly are quite convenient, time saving and labor saving. The present invention has well industrial applicability.

The invention claimed is:

1. A structure for connecting a cross member and a stand member of a bunk bed, wherein:
   an end portion of the cross member is disposed with a shaft sleeve,
   the stand member comprises an upper stand member and a lower stand member,
   a top portion of the lower stand member is disposed with a joint portion configured to be connected to the shaft sleeve and the upper stand member,
   the joint portion comprises an insert hole,
   an internal side surface of the joint portion defines a first inclined surface,
   an external side surface of a bottom portion of the upper stand member defines a second inclined surface,
   the first inclined surface and the second inclined surface are first inclined surfaces coupled to each other,
   the second inclined surface tapers downward,
   the first inclined surface tapers upward,
   the joint portion comprises a housing and an elastic inner sleeve,
   an external side surface of the housing defines an external side surface of the joint portion,
   the elastic inner sleeve is clamped in the housing,
   the elastic inner sleeve comprises the insert hole,
   an internal side surface of the insert hole defines the internal side surface of the joint portion,
   an external side surface of the elastic inner sleeve defines a third inclined surface,
   an internal side surface of the housing defines a fourth inclined surface,
   the third inclined surface and the fourth inclined surface are coupled to each other,
   the fourth inclined surface tapers upward,
   the third inclined surface tapers downward,
   the bottom portion of the upper stand member is disposed in the insert hole,
   the external side surface of the bottom portion of the upper stand member and the internal side surface of the joint portion are transition fit or interference fit,
   the external side surface of the joint portion cooperates with an internal side surface of the shaft sleeve,
   the internal side surface of the shaft sleeve and the external side surface of the joint portion are transition fit or interference fit,
   the first inclined surface, the second inclined surface, the third inclined surface, and the fourth inclined surface are conical,
   and
   at least a portion of a first connection between the external side surface of the bottom portion of the upper stand member and the internal side surface of the insert hole contacts a portion of a second connection between the internal side surface of the shaft sleeve and the external side surface of the housing.

2. The structure according to claim 1, wherein:
   the housing and the lower stand member are integrally formed,
   an external edge of a top end of the elastic inner sleeve comprises a limit ring protruding outward,
   the limit ring hangs on a top end face of the shaft sleeve,
   a bottom end of a side wall of the elastic inner sleeve comprises a plurality of claw catches arranged along a circumferential direction of the elastic inner sleeve, and
   each of the plurality of claw catches elastically stretches to be clamped to the housing.

3. The structure according to claim 2, wherein the elastic inner sleeve is a plastic member or a deformable member.

4. The structure according to claim 1, wherein the joint portion is welded or locked to the top portion of the lower stand member.

5. The structure according to claim 4, wherein the lower stand member is a hollow pipe.

6. The structure according to claim 1, wherein:
   the lower stand member is a solid pipe, and
   the joint portion and the lower stand member are integrally formed.

7. A bunk bed, comprising:
   an upper cross member,
   a lower cross member, and
   a stand member, wherein:
      the stand member comprises an upper stand member, a central stand member, and a lower stand member,
      an end portion of the upper cross member is disposed with a first shaft sleeve,
      a top portion of the central stand member is disposed with a first joint portion configured to be connected to the first shaft sleeve of the upper cross member and the upper stand member,
      the first joint portion comprises a first insert hole,
      an internal side surface of the first joint portion defines a first inclined surface,
      an external side surface of a bottom portion of the upper stand member defines a second inclined surface,
      the first inclined surface and the second inclined surface are coupled to each other,
      the second inclined surface tapers downward,
      the first inclined surface tapers upward, the first joint portion comprises a first housing and a first elastic inner sleeve, an external side surface of the first housing defines an external side surface of the first joint portion, the first elastic inner sleeve is clamped in the first housing, the first elastic inner sleeve comprises the first insert hole, an internal side surface of the first insert hole defines the internal side surface of the first joint portion, an external side surface of the first elastic inner sleeve defines a third inclined surface, an internal side surface of the first housing defines a fourth inclined surface, the third inclined surface and the fourth inclined surface are coupled to each other, the fourth inclined surface tapers upward, the third inclined surface tapers downward, the bottom portion of the upper stand member is disposed in the first insert hole-, the external side surface of the bottom portion of the upper stand member and the internal side surface of the first joint portion are transition fit, the external side surface of the first joint portion cooperates with an internal side surface of the first shaft sleeve, the internal side surface of the first shaft sleeve and the external side surface of the first joint portion are transition fit, an end portion of the lower cross member is disposed with a second shaft sleeve, a top portion of the lower stand member is disposed with a second joint portion configured to be connected to the second shaft sleeve of the lower cross member and the central stand member, the second joint portion comprises a second insert hole, an internal side surface of the second joint portion defines a fifth inclined surface, an external side surface of a bottom portion of the central stand member defines a sixth inclined surface, the fifth inclined surface and the sixth inclined surface are coupled to each other, the sixth inclined surface tapers downward, the fifth inclined surface tapers upward, the second joint portion comprises a second housing and a second elastic inner sleeve, an external side surface of the second housing defines an external side surface of the second joint portion, the second elastic inner sleeve is clamped in the second housing, the second elastic inner sleeve comprises the second insert hole, an internal side surface of the second insert hole defines the internal side surface of the second joint portion, an external side surface of the second elastic inner sleeve defines a seventh inclined surface, an internal side surface of the second housing defines an eighth inclined surface, the seventh inclined surface and the eighth inclined surface are coupled to each other, the eighth inclined surface tapers upward, the seventh inclined surface tapers downward, the bottom portion of the central stand member is disposed in the second insert hole, the external side surface of the bottom portion of the central stand member and the internal side surface of the second joint portion are transition fit, the external side surface of the second joint portion cooperates with an internal side surface of the second shaft sleeve are, the internal side surface of the second shaft sleeve and the external side surface of the second joint portion are transition fit, the first inclined surface, the second inclined surface, the third inclined surface, the fourth inclined surface, the fifth inclined surface, the sixth inclined surface, the seventh inclined surface, and the eighth inclined surface are conical, at least a portion of a first connection between the external side surface of the bottom portion of the upper stand member and the internal side surface of the first insert hole contacts a portion of a second connection between the internal side surface of the first shaft sleeve and the external side surface of the first housing, at least a portion of a third connection between the external side surface of the bottom portion of the central stand member and the internal side surface of the second insert hole contacts a portion of a fourth connection between the internal side surface of the second shaft sleeve and the external side surface of the second housing.

8. The bunk bed according to claim 7, wherein:

an external edge of a top end of each of the first elastic inner sleeve and the second elastic inner sleeve comprises a limit ring protruding outward, the limit rings hang on top end faces of the first shaft sleeve and the second shaft sleeve, a bottom end of a side wall of each of the first elastic inner sleeve and the second elastic inner sleeve comprises a plurality of claw catches arranged along a circumferential direction of a corresponding one of the first elastic inner sleeve or the second elastic inner sleeve, and each of the plurality of claw catches elastically stretches to be clamped to a corresponding one of the first housing or the second housing.

9. The bunk bed according to claim 7, wherein:

the first housing is disposed at the top portion of the central stand member, the second housing is disposed at the top portion of the lower stand member, the first housing and the central stand member are integrally formed, and the second housing and the lower stand member are integrally formed.

10. The bunk bed according to claim 7, wherein:

the central stand member is a solid pipe, the first joint portion and the central stand member are integrally formed, the lower stand member is a solid pipe, and the second joint portion and the lower stand member are integrally formed.

11. A bunk bed, comprising:

an upper cross member, a lower cross member, and a stand member, wherein:

the stand member comprises an upper stand member, a central stand member, and a lower stand member, an end portion of the upper cross member is disposed with a first shaft sleeve, a top portion of the central stand member is disposed with a joint portion configured to be connected to the first shaft sleeve of the upper cross member and the upper stand member,
a central portion of the joint portion comprises an insert hole,
an internal side surface of the joint portion defines a first inclined surface,
an external side surface of a bottom portion of the upper stand member defines a second inclined surface,
the first inclined surface and the second inclined surface are coupled to each other,
the second inclined surface tapers downward,
the first inclined surface tapers upward,
the joint portion comprises a housing and an elastic inner sleeve,
an external side surface of the housing defines an external side surface of the joint portion,
the elastic inner sleeve is clamped in the housing,
the elastic inner sleeve comprises the insert hole,
an internal side surface of the insert hole defines the internal side surface of the joint portion,
an external side surface of the elastic inner sleeve defines a third inclined surface,
an internal side surface of the housing defines a fourth inclined surface,
the third inclined surface and the fourth inclined surface are coupled to each other,
the fourth inclined surface tapers upward,
the third inclined surface tapers downward,
the bottom portion of the upper stand member is disposed in the insert hole,
the external side surface of the bottom portion of the upper stand member and the internal side surface of the joint portion are transition fit,
the external side surface of the joint portion cooperates with an internal side surface of the first shaft sleeve,
the internal side surface of the first shaft sleeve and the external side surface of the joint portion are transition fit,
an end portion of the lower cross member is disposed with a second shaft sleeve,
a top portion of the lower stand member, the second shaft sleeve of the lower cross member, and a bottom portion of the central stand member are connected,
the first inclined surface, the second inclined surface, the third inclined surface, and the fourth inclined surface are conical,
at least a portion of a first connection between the external side surface of the bottom portion of the upper stand member and the internal side surface of the insert hole contacts a portion of a second connection between the internal side surface of the first shaft sleeve and the external side surface of the housing.

12. The bunk bed according to claim 11, wherein:
an external edge of a top end of the elastic inner sleeve comprises a limit ring protruding outward,
the limit ring hangs on a top end face of the first shaft sleeve,
a bottom end of a side wall of the elastic inner sleeve comprises a plurality of claw catches arranged along a circumferential direction of the elastic inner sleeve,
the housing is the top portion of the central stand member, and
each of the plurality of claw catches elastically stretches to be clamped to the housing.

13. A bunk bed, comprising:
an upper cross member,
a lower cross member, and
a stand member, wherein:
the stand member comprises an upper stand member, a central stand member, and a lower stand member,
an end portion of the lower cross member is disposed with a first shaft sleeve,
a top portion of the lower stand member is disposed with a first joint portion configured to be connected to the first shaft sleeve of the lower cross member and the central stand member,
a central portion of the first joint portion comprises an insert hole,
an internal side surface of the first joint portion defines a first inclined surface,
an external side surface of a bottom portion of the central stand member defines a second inclined surface,
the first inclined surface and the second inclined surface are coupled to each other,
the second inclined surface tapers downward,
the first inclined surface tapers upward,
the first joint portion comprises a housing and an elastic inner sleeve,
an external side surface of the housing defines an external side surface of the first joint portion,
the elastic inner sleeve is clamped in the housing,
the elastic inner sleeve comprises the insert hole,
an internal side surface of the insert hole defines the internal side surface of the first joint portion,
an external side surface of the insert hole defines a third inclined surface,
an internal side surface of the housing defines a fourth inclined surface,
the third inclined surface and the fourth inclined surface are coupled to each other,
the fourth inclined surface tapers upward,
the third inclined surface tapers downward,
the bottom portion of the central stand member is disposed in the insert hole,
the external side surface of the bottom portion of the central stand member and the internal side surface of the first joint portion are transition fit,
the external side surface of the first joint portion cooperates with an internal side surface of the first shaft sleeve,
the internal side surface of the first shaft sleeve and the external side surface of the first joint portion are transition fit,
an end portion of the upper cross member is disposed with a second shaft sleeve,
a top portion of the central stand member, the second shaft sleeve of the upper cross member, and the upper stand member are connected,
the first inclined surface, the second inclined surface, the third inclined surface, and the fourth inclined surface are conical,
and
at least a portion of a first connection between the external side surface of the bottom portion of the central stand member and the internal side surface of the insert hole contacts a portion of a second connection between the internal side surface of the first shaft sleeve and the external side surface of the housing.

14. The bunk bed according to claim 13, wherein:
an external edge of a top end of the elastic inner sleeve comprises a limit ring protruding outward,
the limit ring hangs on a top end face of the first shaft sleeve,
a bottom end of a side wall of the elastic inner sleeve comprises a plurality of claw catches arranged along a circumferential direction of the elastic inner sleeve,
the housing is the top portion of the lower stand member, and
each of the plurality of claw catches elastically stretches to be clamped to the housing.

\* \* \* \* \*